Jan. 10, 1956
M. E. HAMILTON
SIDE DELIVERY RAKE
2,729,931
Filed March 16, 1953
2 Sheets-Sheet 1
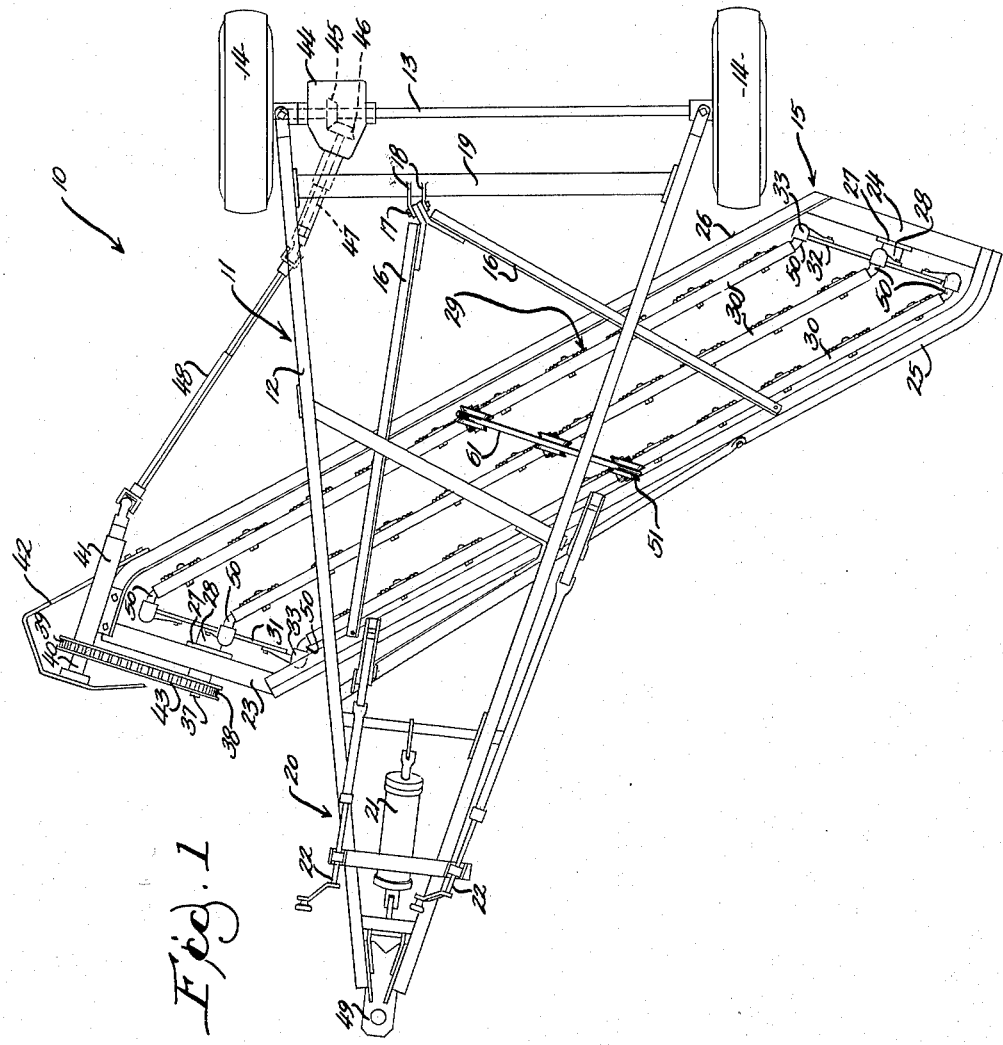
Fig. 1
INVENTOR.
MATTHEW E HAMILTON
BY
ATTORNEY

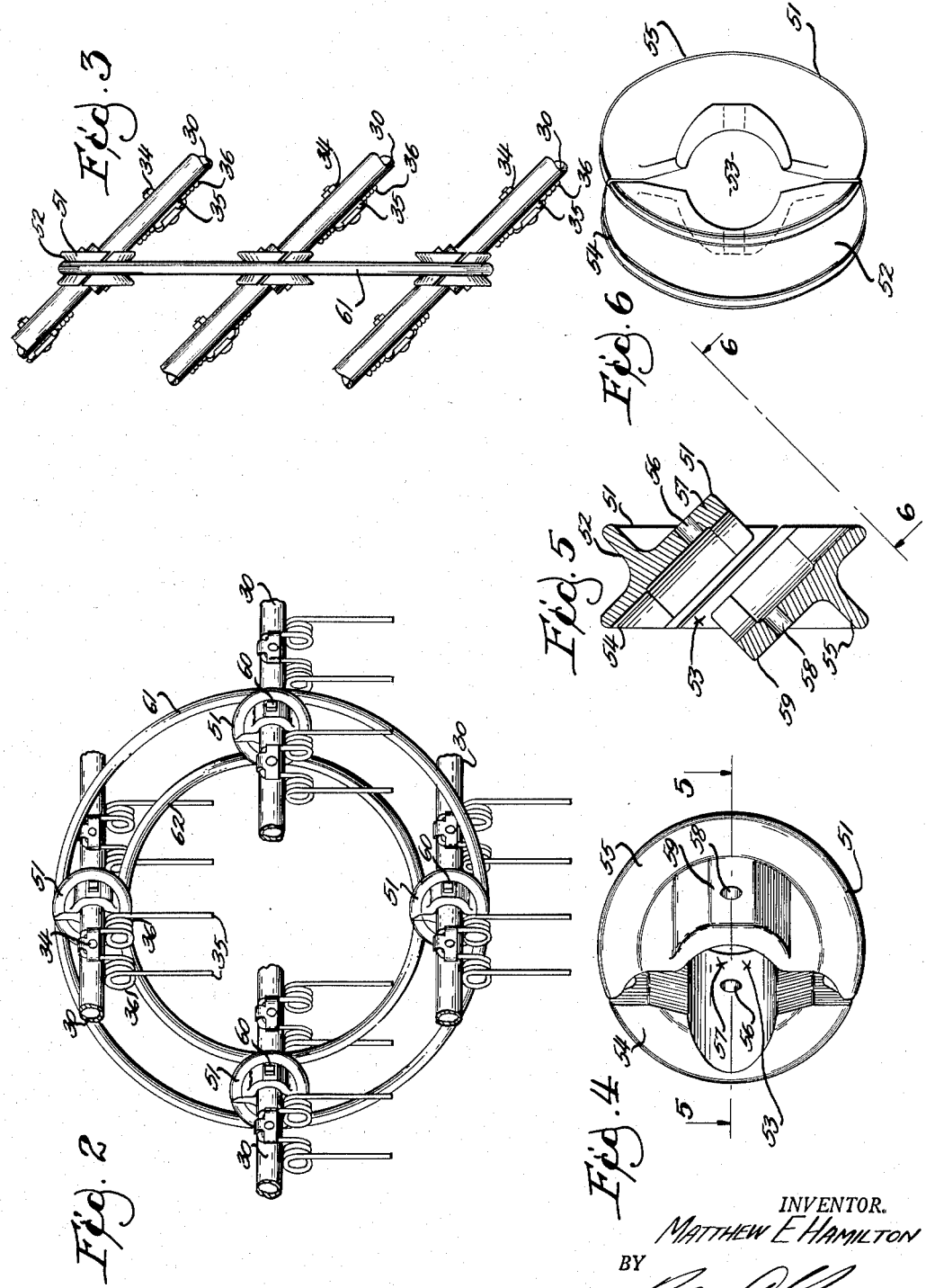

United States Patent Office 2,729,931
Patented Jan. 10, 1956

2,729,931

SIDE DELIVERY RAKE

Matthew E. Hamilton, Stockton, Calif., assignor to J. I. Case Company, Racine, Wis., a corporation of Wisconsin Application March 16, 1953, Serial No. 342,613

16 Claims. (Cl. 56—377)

The present invention relates to improvements in side-delivery rakes, and more particularly to an improved reel construction for a side-delivery rake wherein means are provided for preventing deflection of the tooth bars of the reel, and the primary object of the present invention is to generally improve the operation and construction of machines of this type.

A further object of the present invention is to provide a center bearing ring construction for the reel of a side delivery rake which is effective for preventing deflection of the tooth bars either inwardly or outwardly with respect to the axis of the reel, the force acting upon the tooth bars tending to cause the tooth bars to deflect outwardly being in most instances the result of centrifugal force imposed thereupon when the reel is rotated in operation, and the force acting upon the tooth bars to deflect them inwardly being in most instances the result of the tines striking an obstruction or being caused to move a heavy load or windrow, the center bearing ring construction being capable of being easily and economically manufactured and assembled.

Other and further important objects of the present invention will become apparent from the following detailed description and from the accompanying sheets of drawings in which:

Fig. 1 is a plan view of a side-delivery rake embodying the present invention, with parts removed.

Fig. 2 is a left-front view of a portion of the reel of the rake shown in Fig. 1, slightly enlarged and with parts broken away.

Fig. 3 is a plan view of the structure shown in Fig. 2 with parts broken away.

Fig. 4 is a front view of certain structure shown in Fig. 2, slightly enlarged.

Fig. 5 is a cross-sectional view taken on the line 5—5 of Fig. 4 and then turned 90 degrees in a clockwise direction.

Fig. 6 is a view looking in the direction of line 6—6 of Fig. 5.

While the present invention is capable of being used on many different types and styles of side-delivery rakes, it is shown as being embodied in a side-delivery rake generally designated as 10, see Fig. 1, the rake 10 in the present instance comprising a main supporting frame 11, the center part of which is formed in an arch 12. Rearwardly the main supporting frame 11 rotatably supports a suitable transverse driving axle 13 which has suitably fixed to the opposite ends thereof conventional supporting wheels 14, the driving axle 13 and the supporting wheels 14 providing a source of motive power for driving the instrumentalities of the rake as will appear more fully hereinafter. A cylinder frame 15, which is fabricated from structural members and which is substantially in the shape of a parallelogram, is swingably supported beneath the arched main frame by means of a rearwardly extending A-frame 16, the A-frame 16 being pivotally secured as by bolt 17 between suitable spaced apart brackets 18 fixed to a rear brace member 19 of the main frame. Forwardly the cylinder frame 15 and the A-frame 16 are suspended from the main frame 11 by means of a reel lift and adjusting mechanism broadly designated as 20. Reel lift and adjusting mechanism 20 is preferably of the type employing a hydraulic cylinder 21 for effecting a rapid adjustment of the cylinder frame 15 from a working to a raised or transport position, and a pair of manual adjustments 22 are provided for effecting a fine adjustment of the cylinder frame 15 with respect to the ground independently of the adjustment effected by the hydraulic cylinder 21. A preferred reel lift and adjusting mechanism for use in a rake of this type is fully explained and described in the application of Hamilton, Ser. No. 227,309, filed May 21, 1951, now Patent No. 2,672,005 granted March 16, 1954, but since the mechanism for swinging the cylinder frame 15 into various adjusted vertical positions with respect to the ground is not deemed a part of the present invention, and since many mechanisms are well-known in the art for effecting this particular function, further discussion of the details of mechanism 20 is not considered necessary for a clear understanding of the present invention.

The cylinder frame 15 in the present instance is substantially in the shape of a parallelogram as previously described and includes end members 23 and 24 and connecting front and rear members 25 and 26, members 23 and 24 being positioned in spaced apart relationship and substantially at right angles with respect to the direction of travel of the machine. Suitable depending brackets 27 are fixed to each of the end members 23 and 24, and these brackets each carry a suitable bearing 28 in which is rotatably supported a cylinder or reel generally designated as 29, the reel 29 in the present instance being of the type which rakes cut material in a true sideward motion instead of in the forward and sideward motion of the more conventional reels.

Reel 29 in the present instance includes four equally circumferentially spaced tooth bars 30 which are rotatably supported between substantially parallel end plates or supports 31 and 32 by means of suitable bearings or the like 33, the axis of each of the tooth bars 30 obliquely intersecting the planes of the respective end plates 31 and 32. Each of the tooth bars 30 has secured thereto by bolts or the like 34 suitable spaced-apart tines 35 which are preferably of the type having coiled portions 36 for providing thereto the required amount of resiliency, see also Fig. 2. Upon rotation of the reel 29, the tooth bars 30 are moved in an elliptical path and they have a susbtantial component of motion in the direction of their lengths toward the left, as viewed in Fig. 1, this longitudinal component of motion of the tooth bars causing the crop material to be moved sideways toward the left along the reel to a much greater extent than would be accomplished by the angle of the reel alone as well known in the art.

A stub shaft associated with the end plate 31 extends forwardly of bearing 28 as indicated at 37 and has fixed adjacent the end thereof a suitable sprocket 38. A sprocket 39 is nonrotatably fixed to a suitable jack shaft 40, and a suitable journal housing 41 is so positioned with respect to the cylinder frame 15 and an auxiliary frame 42 as to position the sprocket 39 in driving alignment with respect to the sprocket 38. A driving chain 43 of any well-known or suitable construction drivingly connects sprocket 39 to sprocket 38. A gear box 44 is carried on the axle shaft 13 and encloses a bevel gear 45 which is fixed to the shaft 13 and a bevel gear 46 which is positioned in intermeshing relationship with respect to the bevel gear 45 and which is fixed to a suitable power-take-off shaft 47. Power-take-off shaft 47 is drivingly connected to the jack shaft 40 by means of a telescopic universal shaft 48 of any well-known construction so that the rotary motion of the axle 13 upon forward movement of the rake is imparted through the bevel gears 45 and 46 to the reel 29 for driving the reel by means of the telescopic universal shaft 48, the jack shaft 40, the sprockets 39 and 38, and the power transmitting chain 43.

Forwardly the main supporting frame 11 is provided with a suitable forwardly extending clevis 49 which is capable of being attached to the drawbar of a suitable propelling vehicle in a manner well-known in the art.

Upon the reel 29 being driven or rotated in a pickup direction upon forward movement of the machine, the tooth bars 30 are moved in a circular path about the transversely disposed axis of the reel. Although the tooth bars 30 are moved in an elliptical path and have a substantial component of motion in the direction of their lengths to the left as previously suggested, the individual tooth bars do not rotate with the end plates 31 and 32 but have rather an action which is similar to that of the carriages of an amusement device commonly referred to as a "Ferris wheel." In other words the tooth bars may be said to revolve in relation to the axis of the reel but do not rotate around their own axes. The tooth bars are carried in the bearings 33 so as to position the tines 35 in a depending condition with respect to the ground, the tooth bars being maintained in this position, and being caused to move in an elliptical path when the reel 29 is rotated by reason of the fact that the end sections or portions of each of the tooth bars, which are designated by the number 50, are bent sufficiently to be substantially parallel to the axis of rotation of the respective end plates 31 and 32, the intermediate portions of the tooth bars being disposed angularly to these axes of rotation. More specifically, the axes of rotation of the end plates 31 and 32 intersect the axes of the tooth bars 30 at an oblique angle as viewed in Fig. 1 and in a manner well known in the art.

The reel 29 as previously suggested includes four circumferentially and equally spaced tooth bars 30, and due to the relatively great length and the relatively small cross-sectional areas of each of these tooth bars, they have a tendency to deflect radially outwardly from the axis of the reel in response to centrifugal force when the reel is rotated in a pickup direction upon forward movement of the machine. These tooth bars are also caused to deflect inwardly toward the axis of the reel, when, during operation of the reel, a tine strikes an obstruction or is caused to turn a heavy load such as a heavy windrow of cut material. Deflection of the tooth bars, either inwardly or outwardly with respect to the axis of the reel, is undesirable and tends to shorten the life of the reel by causing damage to the bearings 33 which support the opposite ends of the tooth bars. The present invention therefore relates to means for limiting the deflection of the tooth bars 30 regardless of the speed of rotation of the reel and regardless of all normal contact between the tines and obstructions on the ground, prolonging thereby the life of the reel and consequently of the machine.

The present invention contemplates the use of a plurality of members 51, one sheave being provided for each of the tooth bars 30, see also Figs. 3, 4, 5, and 6. Each of the sheaves 51 is provided with a peripheral friction engaging surface 52 and a center bore 53, the axis of the bore 53 being oblique with respect to a plane through the friction engaging surface 52, and this relationship is such that when the sheave is secured to a tooth bar 30, in a manner such as will be described presently, the bore 53 being formed of a size to conveniently receive therein the tooth bar, the plane of the friction engaging surface 52 of the sheave will lie in a plane which is substantially parallel with respect to the end plates 31 and 32. Each of the sheaves 51 is preferably in the form of a casting and is made in two parts 54 and 55, and an opening 56 is formed in a semi-circular hub portion 57 of sheave half 54 and an opening 58 is formed in a semi-circular hub portion 59 of sheave half 55. Each of the tooth bars 30 is provided with a suitable bolt receiving opening, not visible in the drawings, and a bolt 60 is received by the opening 56, the opening formed in the tooth bar, and the opening 58 for securing each of the sheaves 51 to the circumferential surface of each of the tooth bars 30 as well as for securing each of the sheave halfs 54 and each of the sheave halfs 55 together in mating relationship. A sheave is secured to each of the tooth bars 30 and preferably positioned halfway between the end plates 31 and 32 so that a plane through the friction engaging surface 52 of one of the sheaves is substantially coplanar with a plane through the friction engaging surfaces of the other of the sheaves, all of the sheaves 51 lying in a plane which is substantially parallel to the end plates 31 and 32. The friction engaging surface 52 of each of the sheaves is substantially concave in cross-section, and an outer ring 61, substantially circular in cross section is received in the engaging surface 52 of each of the sheaves 51 so as to substantially encircle the sheaves and the tooth bars 30.

An inner ring 62 is received by the engaging surface 52 of each of the sheaves 51 so as to lie substantially in the plane of the sheaves 51 and so as to be encircled by the sheaves and within the cage formed by the tooth bars 30. The outer ring 61 is formed of a size whereby the inner periphery thereof is in frictional engagement with the concave surface of the friction engaging surface 52 of each of the sheaves so that when the reel 29 is rotated or driven in a pickup direction upon forward movement of the machine, each of the tooth bars 30 which ordinarily will have a tendency to deflect outwardly or radially due to the centrifugal force imposed thereupon or due to any other force, will be restrained by the ring 61, a force tending to deflect one tooth bar outwardly being transferred by the outer ring to the other tooth bars so that in order to deflect one tooth bar, all tooth bars must be deflected in the same direction. Also, since the tooth bars in the present instance are carried in substantially opposed relationship and since opposite or opposed tooth bars will tend to deflect in an opposite direction a substantially like distance, the centrifugal force imposed upon one tooth bar tending to deflect this tooth bar outwardly in one direction is transferred to the outer ring and is equalized by the centrifugal force imposed upon the opposed or opposite tooth bar and transferred to the outer ring tending to deflect this tooth bar in the opposite direction. The ring 61 therefore, being in rolling engagement with respect to the peripheral engaging surfaces 52 of the sheaves 51, will prevent deflection of the tooth bars 30 outwardly from the axis of the reel, and the rolling frictional relationship between the sheaves 51 and the outer ring 61 permits relative rotative movement of the tooth bars sufficiently to maintain the tines in their downwardly depending position while the reel is being rotated or driven in a pickup or raking direction. The inner ring 62 is also formed of a size so as to be in frictional rolling contact or engagement with the concave surface of the friction engaging surface 52 of the sheaves 51. Deflection of a tooth bar inwardly with respect to the axis of the reel such as when striking an obstruction, when turning a heavy row of cut material or when striking a slight rise in the ground for instance, is considerably reduced. The inner ring transfers the load from one tooth bar to one or more of the others so that in order to deflect one of the tooth bars, all of the tooth bars or at least the opposite tooth bar, must be deflected in the same direction, thereby increasing the strength of the reel considerably.

What I claim is:

1. In a reel for a side-delivery rake having circumferentially spaced tooth bars, parallel end plates for rotatably supporting the tooth bars at the opposite ends thereof, spaced tines carried by the respective tooth bars, and means for effecting relative rotation of said tooth bars with respect to said end plates for maintaining each of said tines in a depending position with respect to said tooth bars, the improvement comprising a center bearing ring construction for the reel for preventing outward deflection of the tooth bars with respect to the axis of said reel in response to force imposed thereupon during rotation of the reel, said center bearing ring construction comprising a ring telescopically received by said reel substantially halfway between the ends thereof, a member fixed on each of the tooth bars shaped to interlock with said ring for positioning the ring in parallelism with respect to said end plates and preventing movement thereof axially of said reel, said members being in rolling frictional relationship with respect to the inner circumference of said ring, a force imposed upon one of the tooth bars tending to deflect said one tooth bar outwardly being transferred by said ring to other of said tooth bars for causing deflection thereof in the same direction.

2. The improvement recited in claim 1 further characterized by said tooth bars being equally circumferentially spaced about the axis of said reel.

3. The improvement recited in claim 1 further characterized by said members on each of said tooth bars for positioning the ring in parallelism with respect to the end plates being in the form of a sheave fixed to each of the respective tooth bars, the outer periphery of each of the sheaves having a suitable depression formed therein for frictionally receiving therein the inner circumference of said ring.

4. In a reel for a side-delivery rake having circumferentially spaced tooth bars, parallel end plates for rotatably supporting the tooth bars at the opposite ends thereof, spaced tines carried by the respective tooth bars, and means for effecting relative rotation of said tooth bars with respect to said end plates for maintaining each of said tines in a downwardly depending position with respect to said tooth bars, the improvement comprising a center bearing ring construction for the reel for preventing inward deflection of the tooth bars with respect to the axis of said reel in response to force imposed thereupon during rotation of the reel, said center bearing ring construction comprising an inner ring received within the confines of the cage formed by said tooth bars, and a member on each of the tooth bars shaped to interlock with said inner ring for positioning the inner ring in parallelism with respect to said end plates and preventing movement thereof axially of said reel, said members being in rolling frictional relationship with respect to the outer periphery of said ring, said inner ring being of a size whereby a force imposed against one of said rings tending to deflect said ring inwardly with respect to the axis of said reel will be transferred by said ring to said other tooth bars thereby increasing the strength of the reel.

5. The improvement recited in claim 4 further characterized by said tooth bars being equally circumferentially spaced about the axis of said reel.

6. The improvement recited in claim 4 further characterized by said members on each of said tooth bars for positioning the inner ring in parallelism with respect to the end plates being in the form of a sheave fixed to each of the tooth bars, the outer periphery of each of the sheaves having a suitable depression formed therein for frictionally receiving therein the outer circumference of said ring.

7. In a reel for a side-delivery rake having circumferentially spaced tooth bars, parallel end plates for rotatably supporting the tooth bars at the opposite ends thereof, spaced tines carried by the respective tooth bars, and means for effecting relative rotation of said tooth bars with respect to said end plates for maintaining each of said tines in a downwardly depending position with respect to said tooth bars, the improvement comprising a center bearing ring construction for preventing deflection of said tooth bars with respect to the axis of said reel, said center bearing ring construction comprising an outer ring telescopically received by said reel so as to encircle said tooth bars, an inner ring received within the confines of the cage formed by said tooth bars, and a member on each of the tooth bars shaped to interlock with said rings for positioning each of the rings in parallelism with respect to said end plates and preventing movement thereof axially of said reel, said means being in rolling frictional relationship with respect to the inner circumference of said outer ring and the outer circumference of said inner ring, a force imposed upon one of said tooth bars tending to deflect said tooth bar either inwardly or outwardly with respect to the axis of the reel being transferred by said inner ring or said outer ring, depending upon the direction of the deflecting force, to said other tooth bars thereby increasing the strength of the reel.

8. The improvement recited in claim 7 further characterized by said tooth bars being equally circumferentially spaced about the axis of said reel.

9. The improvement recited in claim 7 further characterized by said inner ring and said outer ring being positioned substantially halfway between said end plates.

10. The improvement recited in claim 7 further characterized by said member on each of said tooth bars for positioning the inner ring and the outer ring in parallelism with respect to the end plates being in the form of a sheave fixed to each of the tooth bars, the outer periphery of each of the sheaves having a suitable depression formed therein for frictionally receiving therein the outer circumference of said inner ring and the inner circumference of said outer ring.

11. In a reel for a side-delivery rake of the type having circumferentially spaced tooth bars, parallel end plates for rotatably supporting the tooth bars at the opposite ends thereof, the axes of said tooth bars intersecting the plane of said end plates at an oblique angle, spaced tines carried by each of the tooth bars, and means for effecting relative rotation of the tooth bars with respect to said end plates for maintaining said tines in a downwardly depending position with respect to said tooth bars, said tooth bars being caused to move in an elliptical path, the improvement comprising a center bearing ring construction for preventing deflection of said tooth bars, said center bearing ring construction comprising a sheave fixed to each of said tooth bars substantially halfway between the ends thereof, each of said sheaves having a peripheral engaging surface and all of said sheaves lying in a plane in parallelism to said end plates, an outer ring encircling said tooth bars and received by the friction engaging surface of each of said sheaves, an inner ring received within the cage formed by said tooth bars and received in the friction engaging surface of said sheaves, said outer ring and said inner ring being in frictional engagement with respect to said sheaves, whereby a force exerted against one of said tooth bars tending to deflect said tooth bar either inwardly or outwardly with respect to the axis of said reel is transferred by said inner ring or said outer ring, depending upon the direction of the deflecting force, to other tooth bars thereby increasing the strength of the reel.

12. In a rake including a supporting frame, a raking reel journaled on said frame and means for rotating said reel; the combination of a pair of spaced tooth bar carrying members forming the ends of said reel and supported for rotation, circumferentially spaced tooth bars journaled at the peripheries of said members to revolve with rotation of said members, and adapted to remain in fixed predetermined angular relation to the ground, grooved sheaves fixed intermediate the ends of said tooth bars and having their grooves disposed substantially in a common plane, and a ring disposed in said common plane and in rolling contact in the grooves of said sheaves.

13. In a rake including a supporting frame, a raking reel journaled on said frame and means for rotating said reel; the combination of a pair of spaced tooth bar carrying supports forming the ends of said reel and journaled for rotation on a common axis, circumferentially spaced tooth bars journaled at the peripheries of said supports at intervals about said axis to revolve with rotation of said supports, and adapted to remain in fixed predetermined angular relation to the ground, grooved sheaves fixed intermediate the ends of said tooth bars and having their grooves disposed substantially in a common plane, and a ring disposed in said common plane and in rolling contact with the portions of said grooves of said sheaves proximal to said common axis.

14. In a rake including a supporting frame, a raking reel journaled on said frame and means for rotating said reel; the combination of a pair of spaced tooth bar carrying supports forming the ends of said reel and journaled for rotation on a common axis, circumferentially spaced tooth bars journaled at the peripheries of said supports at intervals about said axis to revolve with rotation of said supports, and adapted to remain in fixed predetermined angular relation to the ground, grooved sheaves fixed intermediate the ends of said tooth bars and having their grooves disposed substantially in a common plane, and a ring disposed in said common plane and in rolling contact with the portions of said grooves of said sheaves distal from said common axis.

15. In a rake including a supporting frame, a raking reel journaled on said frame and means for rotating said reel; the combination of a pair of spaced tooth bar carrying supports forming the ends of said reel and journaled for rotation on a common axis, circumferentially spaced tooth bars journaled at the peripheries of said supports at intervals about said axis to revolve with rotation of said supports, and adapted to remain in fixed predetermined angular relation to the ground, grooved sheaves fixed intermediate the ends of said tooth bars and having their grooves disposed substantially in a common plane, a ring disposed in said common plane and in rolling contact with the portions of said grooves of said sheaves distal from said axis, and a ring disposed in said common plane and in rolling contact with the portions of said grooves proximal to said axis.

16. In a rake including a supporting frame, a raking reel journaled on said frame and means for rotating said reel; the combination of a pair of spaced tooth bar carrying supports forming the ends of said reel and journaled for rotation on a common axis, circumferentially spaced tooth bars journaled at the peripheries of said supports at intervals about said axis to revolve with rotation of said supports, and adapted to remain in fixed predetermined angular relation to the ground, separable sheaves adapted to be assembled on said tooth bars intermediate the ends thereof and substantially in a common plane, the peripheries of said sheaves distal from said axis describing a circle which is greater than the outer periphery of one of said tooth bar carrying supports, and a ring disposed in said common plane and in rolling contact with the peripheries of said sheaves.

References Cited in the file of this patent

UNITED STATES PATENTS 471,648     Mann _____ Mar. 29, 1892